United States Patent [19]

Bernstein et al.

[11] 4,433,063
[45] * Feb. 21, 1984

[54] HYDROGEN SORBENT COMPOSITION

[75] Inventors: Philip Bernstein, Glen Ridge, N.J.; James P. Coffey; Alan E. Varker, both of Warwick, N.Y.; John T. Arms, Monroe, N.Y.; William D. K. Clark, Warwick, N.Y.; Paul D. Goodell, Ridgewood, N.J.

[73] Assignee: MPD Technology Corporation, Wyckoff, N.J.

[*] Notice: The portion of the term of this patent subsequent to Jun. 1, 1999 has been disclaimed.

[21] Appl. No.: 342,072

[22] Filed: Jan. 25, 1982

Related U.S. Application Data

[63] Continuation-in-part of Ser. No. 226,455, Jan. 19, 1981, abandoned.

[51] Int. Cl.$^3$ .............. B01J 20/26; B01J 31/06
[52] U.S. Cl. .................. 502/402; 62/48; 206/0.7; 220/88 R; 252/181.6; 423/248; 423/648 R; 429/42; 502/101; 502/159
[58] Field of Search .......... 252/430, 428, 425.3; 423/648 R, 248; 429/42; 264/122; 206/0.7; 220/88 R; 62/48

[56] References Cited

U.S. PATENT DOCUMENTS

| | | | |
|---|---|---|---|
| 3,060,254 | 10/1962 | Urry | 136/24 |
| 3,121,029 | 2/1964 | Duddy | 136/19 |
| 3,375,208 | 3/1968 | Duddy | 260/2.1 |
| 3,395,049 | 7/1968 | Thompson | 252/428 |
| 3,630,781 | 12/1971 | Rampel | 136/30 |
| 3,838,092 | 9/1974 | Vogt et al. | 260/33.6 F |
| 3,881,960 | 5/1975 | Haschka et al. | 136/120 FC |
| 3,898,099 | 8/1975 | Baker et al. | 136/75 |
| 3,936,394 | 2/1976 | Kusunose et al. | 252/430 |
| 3,954,501 | 5/1976 | Rampel | 136/24 |
| 3,993,584 | 11/1976 | Owen et al. | 252/383 |
| 4,036,944 | 7/1977 | Blytas | 423/648 R |
| 4,107,395 | 8/1978 | Van Ommering et al. | 429/21 |
| 4,110,425 | 8/1978 | Bühl et al. | 423/648 R |
| 4,134,490 | 1/1979 | Turillon et al. | 206/0.7 |
| 4,153,661 | 5/1979 | Ree et al. | 264/120 |
| 4,194,040 | 3/1980 | Breton et al. | 264/122 |
| 4,196,525 | 4/1980 | Ebdon et al. | 34/15 |
| 4,259,209 | 3/1981 | Nakane et al. | 252/430 |
| 4,332,698 | 6/1982 | Bernstein et al. | 252/430 |
| 4,358,396 | 11/1982 | Bernstein et al. | 252/430 |
| 4,360,569 | 11/1982 | Steyert et al. | 423/248 |
| 4,385,019 | 5/1983 | Bernstein et al. | 429/42 |

Primary Examiner—P. E. Konopka
Attorney, Agent, or Firm—Miriam W. Leff; Raymond J. Kenny

[57] ABSTRACT

A hydrogen sorbent composition is provided which is comprised of a hydridable material such as LaNi$_5$ encradled throughout a porous, fiber-containing polymeric composition.

19 Claims, 1 Drawing Figure

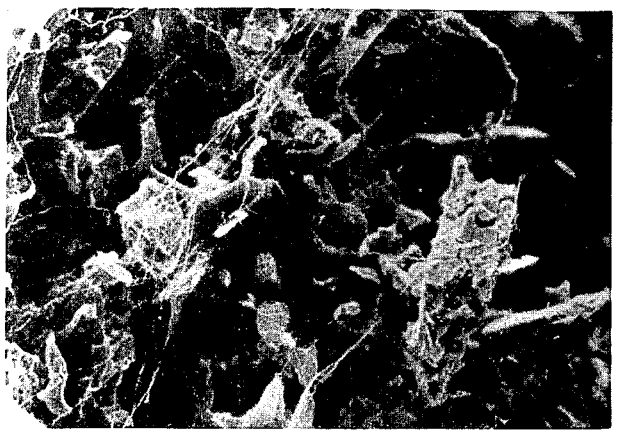

HYDROGEN SORBENT COMPOSITION

The present invention relates to a process and a composition for forming an active material encradled in a porous, fiber-containing polymeric material and products formed therefrom.

RELATED APPLICATION

This application is a continutation-in-part of application Ser. No. 226,455, filed Jan. 19, 1981, now abandoned.

BACKGROUND OF THE INVENTION

The use of inert materials to envelop particulate active materials for structural, storage and other purposes is well known. The active material may be, for example, gas collecting and storing compositions, and electrochemically active compositions. By "inert" is meant that the material is inactive or not harmful, e.g. chemically or electrically, to the active material or to the system in which the active material is ultimately used. In the compositions contemplated in the present invention, it is important that the inert material retain the active material but without, or with minimum, sacrifice of access to the surfaces of the active material and without interfering with the active function of the particles.

It has been particularly difficult to find a material which will tolerate large changes in volume of the enveloped particles, such as that which occurs in many hydridable compositions when they are used for hydrogen sorption characteristics. The hydridable materials which undergo volume changes in use have a tendency to disintegrate and this causes many problems such as loss of materials and plugging of the equipment. The present process is disclosed particularly with reference to materials having particulate hydridable compositions as the active components of the system.

Various inert materials have been proposed for coating particulate hydridable compositions. U.S. Pat. No. 3,881,960, for example, discloses hydrogen storage electrodes for galvanic cells in which the particles are coated with $TiNi_3$. The $TiNi_3$ is inactive, has high hydrogen permeability and is sufficiently elastic so that it can withstand the volume changes of the active components. Cost considerations and the difficulty in coating the particle surfaces make this method impractical. U.S. Pat. Nos. 4,036,944 and 4,110,425 disclose hydridable materials bonded in a polymeric matrix. In the '944 patent, the binder is a thermoplastic elastomer having a specified block copolymer structure, and pellets containing 50% to 99% of active component are formed from a paste. The paste is pelleted under pressure. In the '425 patent, the active material having a specified grain size range is formed by cementing or sintering the hydrogen-storing powders with heat resistant plastics. In the preparation, the active particles are mixed with the plastic in the form of a powder, suspension, emulsion, solution or melt. The examples show that an emulsion is used.

Polymeric structures such as those described above do not allow for maximum exposure of the surface of the active material.

OBJECTS OF THE INVENTION

It is an object of the present invention to overcome or alleviate the above-noted problems of the prior art.

It is also an object of the present invention to provide a suitable polymeric structure for hydridable material.

An additional object is to provide a process which is amenable to standard polymer processing equipment and one which will permit the production of unlimited size shape and form of the polymer structure.

Additional objects will become apparent from the disclosure which follows.

BRIEF DESCRIPTION OF DRAWING

The drawing is a photomicrograph at 1000X magnification which shows an active material encradled in a porous, fiber-containing polymeric composition in accordance with the present invention.

THE INVENTION

In accordance with one aspect of the present invention a polymeric active composition is provided which comprises an active material encradled throughout a porous, fiber-containing polymeric material. The polymeric active composition is formed from (a) active particles (or a precursor thereto) and (b) a tripartite system comprising (1) a fibrillatable first polymer, (2) a support-contributing second polymer, and (3) a major amount of a pore-former, the pore-former being characterized in that it is removable from the mixture and it can be uniformly dispersed in the system, said components of the tripartite system being non-reactive with each other, with the active material, and with the environment in which they will be used. Preferably, the pore-former wets or can be made to wet the surfaces of the active particles. Advantageously, the pore-former is a water-soluble resin, and it is conveniently removed by dissolution in water.

In accordance with another aspect of the present invention, a hydridable material encradled in a porous, fiber-containing polymeric material is provided, said composition being developed from components comprising (a) particulate hydridable material and (b) a tripartite system comprising a fibrillatable first polymer, a support-contributing second polymer, and a major amount of removable pore-former, said components being compatible and non-reactive with each other. In a preferred embodiment, the hydridable material is $LaNi_5$.

In accordance with another aspect of the present invention a polymeric active composition comprised of an active material and a porous, fiber-containing polymeric material is prepared by a process comprising subjecting a support-contributing polymer, a fibrillatable polymer, an active material, and a removable pore-former, to conditions to fibrillate the fibrillatable polymer and to form an intimate mixture of the fibers, support-contributing polymer and pore-former, and then removing the pore-former to provide porosity in the composition. In the resultant system fibrils encradle the active material and the fibril-encradled active material is dispersed throughout an intimate mixture of fiber-containing polymeric material.

In a preferred embodiment of the present invention, the conditions are such that fibrillation is achieved in-situ by a dry processing technique, thereby achieving very good distribution of the fibers in the composition and permitting greater freedom in materials and processing steps that can be used. This is of particular advantage when water or moisture—or some other liquid, which might be the mixing medium, is harmful to one of the components such as the active material. Also, by using a dry processing technique for fibrillation, it is possible to carry out the production of the material including fibrillation in standard polymer processing equipment. Another advantage is that, if desired, the final product can be produced in a form which does not require a supporting structure. An essentially self-supporting structure can be formed in accordance with this invention without sintering the polymeric material.

It has been found that in the polymeric active composition of the present invention, the active material is held in the composition but with maximized exposure of the surfaces of such material. It is believed that this is because the active particles are held in place by a fibrous network but the surfaces are free and exposed, with easy access to said surfaces through the pores.

It is a feature of the present invention that the porosity of the polymeric active composition can be controlled with a pore-former. Indeed by various techniques the size and shape of the pores can be controlled, and the pores can be made interconnecting and dispersed throughout the material. Thus, there is no dependence on the polymer for its inherent microporosity. And, although there is no inherent reason which would preclude one from using extrinsic means such as molded channels or honeycomb configurations with the present materials, the active compositions are not dependent on such configurations for providing contact of external reacting environment, e.g. a gas such as hydrogen, with the active material.

In general, the polymeric active composition can be produced in any shape or form that a polymeric material can be used. For example, it can be used in particulate form, e.g. as granules or shaped as pellets, rings, spheres, cylinders and the like, and can be used as sheets, bars, film. It can be self-supporting or supported. The product, which advantageously can be produced in standard polymer processing equipment, can be molded, extruded, milled, blown into film, or otherwise formed into the desired shape.

DETAILED DESCRIPTION OF THE INVENTION

As indicated above, the polymeric active composition is composed essentially of an active (or activatable) material, a fibrillated first polymer, and a support-contributing second polymer, and it is characterized in that it is porous and the pores are formed in-situ by a method which maximizes the accessibility of the active material. The composition is produced from active material and a tripartite system.

The components of the tripartite system should, of course, be compatible and non-reactive with each other and the polymers should be non-active in the environment in which the ultimate product will be used. It is essential that the fibrillatable polymer be capable of dispersing in the support-contributing polymer. The specific choice of support-contributing polymer will depend on the ultimate use of the polymeric active composition. In general, in addition to serving the dispersing function for the fibrillatable polymer, the support-contributing polymers must be compatible with and chemically stable in the environment in which the material will be used, they must not impede the function of the apparatus for which they are used, and they must serve the structural purpose for which they are intended. It is an advantage of the present materials that they can be provided with strength and structural integrity combined with flexibility depending on the choice of polymer. The use of the support-contributing polymer in addition to the fibrillatable polymer adds another dimension of freedom to the system. By way of illustration, the following polymers can be used either individually or in suitable combinations: polyolefins, such as polyethylene, polypropylene, polybutylene, polyisobutylene or co-polymers thereof with each other or with ethylacrylate and/or vinyl acetate; halogenated polyhydrocarbons and co-polymers; polyamides; polysulfones; polyacetates; polycarbonates; polyesters; cellulose esters; or silicones. Preferred support-contributing polymer compositions for hydrogen-storage members are thermoplastic polymers such as polyolefins, e.g. polyethylene, polypropylene and co-polymers thereof, because they are substantially saturated compounds and as such would have no interaction with the active material.

The fibrillatable polymer should, of course, be compatible with the support-contributing and be capable of dispersing in it, and it should be non-reactive with the environment in which it is to be used. Fluorocarbon and propylene polymers have these suitable characteristics. To be particularly useful for the process of the present invention, it is also advantageous for the polymer to be fibrillatable in a dry-type process. Such polymers are known. For example, polytetrafluoroethylene (PTFE) can be fibrillated from a dry powder and it is commercially available as duPont's "Teflon" 6A and 7A. Fibrillatable polypropylene is available, for example, as strands, tape or film which can be used, e.g., as such or cut or chopped to appropriate size. The fibrous component is effective even when present in small amounts, e.g. about 0.5 to 5%, typically about 1–2%, by weight of the active porous composition.

The pore-forming component of the tripartite system must be removable since, to develop the porous active composition, after fibrillation the pore-forming agent is removed leaving the active particles encradled by fibers. The pore-forming component is further characterized in that it is non-reactive with the active material and other components of the system and it wets or can be made to wet the surfaces of the active material. That is, the pore-forming agents will spread on or can be made to spread on the active material. It is preferred that the pore-former be capable of serving as a processing agent in the system, and if so, that it melts below the temperature at which the active material will react. By removable is meant that the pore-former can be removed in any way that is not harmful to the remaining components and in a way that will leave the remaining material in a porous condition. In accordance with the present invention, the pore-former serves as incipient sites for the pores, and after removal, the porosity can be interconnecting and dispersed through the material. The pore-former may be, for example, leachable directly, convertible to leachable compositions or to gaseous products. Leachable pore-forming agents may be selected, for example, from water-soluble, base-soluble, acid-soluble or organic solvent-soluble resins. Water-soluble resins can be removed by leaching with water. It is noted in this regard that addition of water to the formulated fibrous material is not critical or disadvantageous since water added at this stage does not interfere with the advantageous freedom in processing of the dry mix. Examples of pore-formers of the water-soluble type are polyolefin oxides such as polyethylene oxide and polypropylene oxide. Examples of other leachable pore-formers are polyethylenimine, which can be leached with dilute sulfuric acid; polyacrylic acid, which can be leached with dilute sodium hydroxide; and paraffin waxes, which can be leached with halogenated solvents. Removal can also be effected by enzymatic breakdown. Generally, it is possible to use any of the known pore-forming techniques for polymers so long as it is compatible with the system.

A preferred characteristic of the pore-former of this invention is that it is a polymer. As such it is compatible with the fibrillatable polymer and can serve as a system without the need for using very large quantities of additives which must be removed from the fibrillatable polymer, e.g. by filtration, before dry processing. That is, the polymeric pore-former serves as the medium which permits the combination of other components of the system to be uniformly distributed and conveniently worked. The amount used is predetermined primarily by the amount of porosity desired and not by the processing needs of the fibrillatable polymer. And in accordance with the present invention, processing can be carried out in standard polymer processing equipment. Since, the pore-former is by definition removable, no unwanted ingredients are added to the system. A further advantage of using a polymeric pore-former is that it can be used at normal working temperatures for polytetrafluoroethylene or polypropylene, i.e. about 75°–100° C. without reaching a hazardous flash point. For example, Stoddard solvent, which is sometimes considered a medium for working polytetrafluoroethylene, is unsuitable for the present process because it has a flash point of 100 to 110° F. Vehicles also not suitable for the present process are those, such as low molecular weight paraffins, naphthenes, or aromatics such as naphthalene, benzene, or industrial solvents which are mixtures of various organic compounds, e.g. Shell-Sol B or mineral spirits, which may volatilize during working on the processing equipment. A critical problem with vehicles which volatilize during processing is that the pore-former is removed before it can serve as the incipient sites for the pores.

As indicated above, the pore-forming agents, apart from being removable, are further characterized in that they are non-reactive with the active material and polymeric material, and they wet or can be made to wet the active material. It is believed that if the pore-former coats (i.e. wets or spreads on) the surfaces of the active material, i.e. before removal, this will contribute to the accessibility of the active materials when the pore-former is removed. A suractant may be added to improve the wettability of the pore-former.

Pore-formers such as certain polyolefin oxides, e.g. polyethylene oxide and polypropylene oxide, in addition to being conveniently water-soluble and having suitable melting temperatures (e.g. polyethylene oxide has a melting temperature below 75° C.), have the advantage that they serve as both pore-forming and processing agents for fibrillatable polymers such as polytetrafluoroethyene and polypropylene. In one embodiment of the present invention, the pore-former will also serve as the support-contributing polymer. In such embodiment after removal of the pore-former, the essential constituents of the porous composition will be the active material and the fibrillated polymer. In general, such pore-formers have molecular weights in the neighborhood of 100,000 to 1,000,000.

The amount of pore-former to be incorporated in the precursor composition is dependent on the amount of porosity desired in the ultimate product. In general, the pore-former is present in the precursor material in a major amount, i.e. at least about 10% by weight, typically about 15% to about 50%, and preferably over 25 or 30 weight %. In a hydride system, for example, it is desirable to have maximum exposure of the active material and to have free movement of hydrogen throughout the mass. To achieve this, the porous, polymeric active composition, preferably, has about 70 to 80 volume % porosity, and the pores should be interconnecting. For such porosity, an equivalent volume % of leachable pore-former is needed in the precursor electrode composition, i.e. about 70 to 80 volume %. This is equivalent to about 15 to 50 weight % of polyethylene oxide. To obtain porosity of this extent and type using a fugitive gaseous pore-former considerably more pore-former would be necessary, and this could be estimated based on the volume of gas produced and conditions.

The active materials of the present invention, as indicated, above, find utility for a wide variety of purposes. The active material is, of course, chosen accordingly. For example, the active material may be useful for storing or collecting gases, may have electrochemical properties, or may be catalytically active and the polymeric active composition may then be used, e.g., as a $H_2$ getter in a waste stream, as a $H_2$ electrode, in a battery as an electrode or a separator membrane. By way of example, the active material may be comprised of a hydridable material which can be used for $H_2$ storage, as a $H_2$ collector, in a hydrogen pump or refrigerator, or in a battery. Hydrogen sorbent materials are well-known. They include both pure metals such as Mg, Ti, V, Nb and Pd, and binary, tertiary and more complex alloys of, e.g. rare earths, Ti, Co, Ni, Fe, Zr, Mg, Ca, Mn, and mixtures and other combinations thereof. Illustrative examples are $LaNi_5$, $LaNi_{4.7}Al_{0.3}$, $LaNi_{5-x}Al_x$, $LaCo_5$, $LaNi_3Co_2$, FeTi, $(Fe,Mn)Ti$, $Mg_2Ni$ and $Ti_2Ni$. The conditions for $H_2$ absorption and desorption can differ considerably, depending on the active material, ad therefore the materials of choice for the matrix, fibrillatable polymer and pore-former may depend on the active material chosen as well as the ultimate environment in which the composition is to be used. The active material of the composition may consist substantially entirely of active material per se or it may be comprised of active material and other components which are related to the function of the active material or its function in the polymeric composition. For example, the catalyst material may be supported on a carrier, the hydridable material may contain ballast, etc. The active material may also include components or components in special form which will enhance the thermal or electrical properties of the composition.

In general, the active material is in particulate form. With respect to the hydrogen sorbent materials, for example, it can be very fine, e.g. substantially all powder which will pass a −100 mesh screen or it can be coarse, i.e. the particles will pass a −10 mesh screeen. The very fine powder is indicative of "pre-activated" active material. The coarse powder is characteristic of material which has not yet been activated. The coarse powder will tend to disintegrate on use. It is an advantage of the present invention that the particles can be very fine initially or during use since the particles will be held in the polymeric structure. This permits high activity while minimizing losses due to attrition of the active material.

The active material may be initially active or can be activated, e.g. by treatment with an activating gas under suitable conditions prior to or during use.

In general, the polymeric composition prior to removal of the pore-former is active comprised, by weight, of at least about 50%, e.g. about 50% to 75% or 80% active material, about 0.5 to about 5% fibrillatable polymer, about 47% to about 10% pore-former, and the balance essentially support-contributing polymer. As indicated above, the pore-former may in a special embodiment also serve as the support-contributing polymer. After removal of the pore-former, the polymeric active composition is comprised, by weight, of about 75% to 95% active material, about 1 to about 5% fibrillated polymer and the remainder essentially support-contributing polymer.

Typically the tripartite system from which the fibrillated, porous polymer is developed will have the following composition in weight:

| Component Type | Example | Typical Range (Parts by weight) (Ca) |
| --- | --- | --- |
| Support-Contributing Polymer | Low Density Polyethylene | 5 to 15 |
| Fiber-forming Agent | Teflon 7A | 1 to 10 |
| Leachable Resin | Polyox WSRN-10 | 20 to 60 |

To this mixture may be added, e.g. 142 parts $LaNi_5$. The relative concentration of polymer: active material will vary according to the processing necessary to produce the final shaped product. In the case of a $H_2$-sorbent material using $LaNi_5$ as the active material, a product of this invention will typically be composed predominantly (i.e. over 50 weight %) of active material, preferably about 75% to about 95% active material. Alternatively, the non-polymeric component may be comprised of an active material plus a thermal ballast. In the above example, 142 parts to be added to the polymeric components would be a 25/75 mixture of $LaNi_5$ (hydride former) and Ni 123 (thermal ballast). In the event, thermal ballast is incorporated with the active material, the total active material plus thermal ballast in the hydrogen sorbent composition will be about 75% to about 95% by weight. For further disclosure about thermal ballast, reference is made to U.S. application Ser. No. 11,194, filed Feb. 2, 1979 (incorporated herein by reference) entitled "Thermal Reaction heat Storage Method for Hydride Tanks".

To prepare the porous, active, fiber-containing composition, the initial components (i.e. the active material, the fibrillatable polymer, the support-contributing polymer and the pore-former) are first converted to the precursor polymeric composition by a method comprising subjecting such components to conditions to convert the fibrillatable polymer, preferably by a dry processing technique (e.g. as a powder or tape under shear stresses) to fibrous form and to transform the components to a material composed of discontinuous fibers throughout a substantially homogeneous composition consisting of active material, support-contributing polymer and pore-former. The terms "fibrils" and "fiber-containing" refer to discrete fibers developed in-situ from the fibrillatable polymers during processing to fibrillate the first polymer and intimately disperse components of the system. The components can all be blended together initially, e.g. in a blender such as a Banbury mixer or a ball mill, and then processed, e.g. in an extruder. Alternatively, the components can be mixed with each other and processed in various sequences depending on the desired ultimate configuration and the equipment used. Advantageously, the fibrillatable component is processsed in-situ by a dry processing technique to the fibrous component of the precursor polymeric composition. By fibrillated in-situ is meant that it is fibrillated in the presence of at least one component of the composition, e.g. the active material. By removal of the pore-former, the precursor polymeric composition is converted to the porous product.

The polymeric active composition or precursor thereto can be formed as pellets or other particulate forms and used as such or the pellets can be converted to the desired shape by the usual polymer processing techniques, e.g. extrusion, molding, blowing or combinations thereof. As indicated above, with appropriate choice of processing technique, the components can be processed from a dry particulate mixture directly to a sheet or bar. The thickness of the sheet or bar can be varied and the product can be produced directly as a flexible sheet or film. Alternatively, for example, it can be made into pellets and the pellets extruded and blown to a film or the pellets can be injection molded to a film. The ultimate shape is determined by those skilled in the art for the task intended for the active material.

In a system in which polyethylene is the support-contributing polymer and a water-soluble resin such as polyethylene oxide is the pore-former, mixing can be carried out as a continuous process simultaneously with fibrillation, e.g. in a two-roll mill at 65°–75° C., using the addition sequence: (1) support-contributing polymer, (2) removable pore-former (e.g. a water-soluble resin), (3) fiber-forming resin, (4) active material. As one alternative, batch compounding can be carried out in several sequences, in a mixing vessel such as a Banbury mixer or a twin-screw extruder. For example, pre-fibrillation of the fiber-forming agent (such as Teflon 7A) and active materials can be carried out in a mixer to create maximum fibrillation and dispersion of fibers in the active material. This material is removed from the mixer. The mixer is pre-heated to temperatures of about 75°–100° C. and operated at a controlled mixing speed of 14 RPM. The mixing addition sequence is as follows: First, the support-contributing polymer and water-soluble pore-former resin are added to the mixer and mixed at a temperature of about 65° C. to about 75°–100° C., for about 5 to 10 minutes to insure fluxing. Next a pre-blend of active material and fibrillated polymer is added. The total composition is mixed for an additional 5–10 minutes. The resultant mixture is removed from the mixer and pressed into thin sheets for pelletizing to ⅛" cube. The material is now ready for extrusion, compression molding, injection molding or calendering. It is noted that the material can be extruded, and compositions of this type have been extruded, for example, through a 1/16 inch die into a continuous rod form. If a water-soluble resin, such as Polyox WSRN-10, is used after being extruded as rod (or tubular) form, the extruded form is now leached in water at a temperture of 50° C. to remove the water-soluble resin. After drying the materials are cut to required lengths, with the active $LaNi_5$ or other active material now exposed and encradled in a complex of fibrils. The fibrils are also dispersed throughout the support-contributing polymer. The fibril-encradled active material is dispersed throughout the porous, fiber-containing polymeric composition.

It will be understood by those skilled in the art that the selection of any particular ingredient in a system is a matter of selection depending on ultimate use, availability of materials, cost, etc., and the present invention is not restricted to the particular ingredients disclosed or to the examples. They are merely given as a guide to understanding the present invention. In the illustrative examples given below, $LaNi_5$ is encradled in a fibrillated, porous polymer material. In all examples, the initial "mix" is formed as a mixture of dry powders. The Teflon 7A, a product of duPont, is an extrudable grade of PTFE. WSRN-10, a product of Union Carbide, is the polyethylene oxide component. The $LaNi_5$ is used as a finely divided powder (over 50% passing a −325 mesh screen).

EXAMPLE I

| The Mix | |
|---|---|
| Thermoplastic Support | |
| Contributing Polymer | 9 grams polyethylene |
| Fibrillatable polymer | 1 gram Teflon 7A |
| Pore-former | 40 grams WSRN-10 |
| Active ingredient: | 142 grams $LaNi_5$ |

The mix is completely blended in a Banbury mixer for 17 minutes at room temperature. The resulting mixture is extruded to rod or tube shape through a 19 mm Haake extruder having a screw with an L/D ratio of 20:1. The extruded tubes or rods are now leached in water at a temperature of about 50° C. to remove substantially all of the water soluble resin, thereby forming a porous structure with a maximum amount of active materials exposed. The active $LaNi_5$ is now encradled in a fibrous network within the structure.

EXAMPLE II

| The Mix | |
|---|---|
| Thermoplastic Support | |
| Contributing Polymer | 5 grams polypropylene |
| Fibrillatable material | 0.75 grams Teflon |
| Pore-former | 30 grams WSRN-10 |
| Active ingredient | 100 grams $LaNi_5$ |

The mix is completely blended in a Banbury mixer for 17 minutes at room temperature. The resulting mixture is extruded to rod or tube shape through a 19 mm Hakke extruder having a screw with a L/D ratio of 20:1. The extruded tubes or rods are now leached in water at a temperature of about 50° C. to remove substantially all of the water soluble resin, thereby forming a porous structure with a maximum amount of active materials exposed. The active $LaNi_5$ is now encradled in the fibrous network within the structure.

EXAMPLE III

Using a standard 12-inch ball mill of 6-inch depth and having ceramic balls of ½-inch average size, a mixture of 142 grams of $LaNi_5$ powder and 5 grams of Teflon 7A are mixed at 60 to 60 RPM for 16 hours to fibrillate the polymer in the presence of the active material.

On a pre-heated two-roll rubber mill set at 75° C. with a nip of 0.010 is placed 40 grams of WRSN-10 and 9 grams of United States Industries' FN-500 (a low density polyethylene). The materials are mixed on the rolls for two minutes until a band is formed. Thereafter, the mixture of fibrillated Teflon 7A and $LaNi_5$ obtained from the ball mill is slowly added to the band of polyethylene and pore-former on the mill. The mix is periodically peeled from the mill and folded to insure homogeneity. After five minutes of mixing in this manner, the product is peeled from the mill as a sheet of active $LaNi_5$ encradled in a fiber-containing polymeric material.

EXAMPLE IV

A porous, fiber-containing polymeric structure with $LaNi_5$ particles encradled therein was prepared using a method and ingredients in accordance with the present invention. Photomicrographs as illustrated in the accompanying drawing at 1000X magnification show fibrils intertwining active material and the encradled active material dispersed in porous, fiber-containing polymeric material.

EXAMPLE V

Illustrative samples of active compositions for hydrogen storage, prepared in accordance with the present invention are given below together with typical hydrogen absorption test data.

The samples are prepared by adding a pre-blended mixture of $LaNi_5$ and Teflon to a mixture of pore-former and polyethylene using a Banbury mixer to blend the components. In preparing the pore-former and polyethylene either the entire amount used or a part of it is fluxed initially with the polyetheylene. The remainder is blended sequentially with the resultant mixture of $LaNi_5$, Teflon, pore-former and polyethylene. The final blend of components is extruded to produce a rod of about 3.18 mm (⅛") dia. and then cut into lengths of about 1.59 to 6.35 mm (about 1/16 to ¼"). The resultant material is leached in an ultrasonic water bath to remove the pore-former, and then dried. The components and variations in preparation are given in Table I.

TABLE I

| | Samples | | |
|---|---|---|---|
| | V-A (grams) | V-B (grams) | V-C (grams) |
| Components | | | |
| Polyethylene (M-500) | 15 | 7 | 5 |
| Teflon 7A | 1 | 5 | 7 |
| Polyox WSRN | 22(a) | 60(b) | 30(a) |
| $LaNi_5$ | 112 | 142 | 142 |
| Preparation | | | |
| Pre-Blend (at Room Temperature) | 0 min. | 3 min. | 3 min. |
| Flux-Initial | 130° C./5 min | 130° C./min | 130° C./5 min |
| Sequential | No | Yes | No |
| Extrusion | 120° C.–140° C. | 120° C.–140° C. | 100° C.–130° C. |

(a)WSRN-3000
(b)WSRN-750

The samples are screened in a closed reactor using a test procedure consisting of the following steps:
1. A sample having 8.0 grams of hydriding alloy (0.111 gram atoms of metal for $LaNi_5$) is placed in a 0.615 inch I.D. cylindrical reactor having a thermal time constant of 46 seconds (measured with alloy powder only). The reactor has a thermocouple well located in the bottom section.
2. Evacuation is carried out for about 19 hours and should give a pressure of 20 μm or less.

3. Activation is carried out at 500 psia and is monitored continuously.
4. Cycling to complete activation and stabilization of the sample is done at least 5 times (3 hour cycle frequency).
5. Isotherms (dynamic) are determined for both absorption and desorption at a reaction rate of about 0.022 H/M/min at a nominal reactor temperature of 25° C.
6. Kinetic tests (isobaric) are run at several pressures for both absorption and desorption with a nominal reactor pressure of 25° C.

Data for tests carried out with $LaNi_5$ powder and with ballasted and non-ballasted pellets of the invention are reported in Table II.

It was concluded from the tests that there is good accessibility of the $LaNi_5$ in the polymeric compositions of this invention. Some differences are believed to be related to the pellet thermal conductivity characteristics. Pellet ballasting at the ratio used appeared to provide a significant improvement in kinetics in relation to unballasted pellets. It is noted that the material had not yet been processed for optimum performance. However, dusting appears controllable by the present preparation.

TABLE II

| SAMPLE | HS-118 V-A | HS-111 V-B | HS-129 V-C | HS-120 Powder |
|---|---|---|---|---|
| Sample Data (based on 8 g $LaNi_5$) | | | | |
| Weight (g) | 8.86 | 8.677 | 35.72 | 8.0 |
| $LaNi_5$ (%) | 90.3 | 92.2 | 22.40 | 100. |
| PE/PTFE (%) | 9.7 | 7.7 | 10.31 | 0 |
| Ballast (%) | 0 | 0 | 67.19 | 0 |
| Porosity (g pore-former/total g) | 0.21 | 0.25 | 0.20 | 0 |
| Bulk Density (g/cc) | ~4.2 | ~4.2 | 4.17 | ~9 |
| Packing Density (g/cc) | ~1.4 | 1.21 | ~1.4 | 4 |
| Abs. Plateau (psia) | 45 | ND | 46 | 33 |
| Des. Plateau (psia) | ND | ND | 18 | 22 |
| $H_2$ Capacity (moles at 200 psi) | 0.91 | 0.98 | 0.92 | 1.03 |
| Activation Time (hours) | | | | |
| 500 psia half time | 2.3 | 0.5 | 1.5 | <.03–1.0 |
| 500 psia finish time | 4.0 | 3.5 | >3.5 | <.05–1.3 |
| Absorption Kinetics (half time, min) | | | | |
| 26 → 60 psia | 7.0 | 4.2 | 1.8 | 0.23 |
| 80 | ND | ND | 0.5 | 0.11 |
| 120 | 1.1 | 0.92 | 0.25 | 0.056 |
| 300 | 0.15 | 0.12 | 0.065 | <0.01 |
| Desorption Kinetics (half time, min) | | | | |
| 40 → 2 psia | 7.3 | 4.0 | 2.4 | 0.15 |
| 10 | 7.7 | 6.0 | 3.3 | 0.33 |

ND = no data

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A hydrogen sorbent composition comprising a hydridable material encradled throughout a fiber-containing polymeric material having interconnecting pores therethrough, said composition being developed from a substantially dry mixture of compatible and non-reactive components consisting essentially of:
   (A) a particulate hydridable material, a fibrillatable organic polymer and a major amount of removable pore-former, said pore-former being an organic polymer having a molecular weight of about 100,000 to about 1,000,000 and characterized in that it melts below the temperature at which any of the components of the mixture may react with each other, or
   (B) a particulate hydridable material, a fibrillatable organic first polymer, a support-contributing second polymer and a major amount of removable pore-former;

said porosity of the composition being developed in the mixture of components on removal of the pore-former after fibrillation of the fibrillatable polymer, whereby accessibility to the hydridable material in the composition is maximized.

2. A hydrogen sorbent composition according to claim 1, characterized in that the hydridable material is selected from the group consisting of Mg, Ti, V, Nb, Pd, alloys of Ti, Co, Ni, Fe, Zr, Mg, Ca, Mn, rare earths, and mixtures and other combinations thereof.

3. A hydrogen sorbent composition according to claim 1, characterized in that the hydridable material comprises $LaNi_5$.

4. A hydrogen sorbent composition according to claim 1, characterized in that the support-contributing polymer is a polyolefin and the fibrillatable polymer is polytetrafluoroethylene or polypropylene.

5. A hydrogen sorbent composition according to claim 1, characterized in that the support-contributing polymer is comprised of a polyolefin selected from the group polyethylene, polypropylene and combinations thereof, the fibrillatable polymer is comprised of polytetrafluoroethylene, and the pore-former is comprised of a water-soluble resin selected from the group polyethylene oxide, polypropylene oxide and combinations thereof.

6. A hydrogen sorbent composition according to claim 1, characterized in that prior to removal of the pore-former said composition is comprised, by weight, of about 50% to about 75% hydridable material, about 0.5% to about 5% fibrillated polymer, about 47% to about 10% removable pore-former, and the balance essentially support-contributing polymer.

7. A hydrogen sorbent composition according to claim 1, characterized in that the support-contributing polymer is a thermoplastic polymer.

8. A hydrogen sorbent composition according to claim 1, characterized in that the pore-former wets or can be made to wet the surfaces of the particles.

9. A hydrogen sorbent composition according to claim 5, characterized in that the pore-former is present in an amount of about 70% to about 80% by volume.

10. A hydrogen sorbent composition in accordance with claim 1, characterized in that the removable pore-former is a leachable polymer which serves as a dispersing agent for the fibrillatable polymer and melts below the temperature at which any of the components of the mixture may react and serves the dual function of a support-contributing polymer and pore-former.

11. A hydrogen sorbent composition according to claim 1, characterized in that it is comprised, by weight, of about 75% to about 95% particulate hydridable material, about 1% to about 5% fibrillated polymer, and the remainder essentially support-contributing polymer.

12. A hydrogen sorbent composition, said composition being porous and comprising a hydridable material, discrete fibrils obtained from a fibrillatable first organic polymer, and a support-contributing second polymer, said hydridable material being distributed throughout the composition, and said composition being developed by processing of the components of the composition in the presence of a major amount of a removable pore-former and said porosity being developed on the removal of the pore-former, whereby accessibility to the hydridable material in the composition is maximized.

13. A hydrogen sorbent composition according to claim 12, characterized in that the processing of components is carried out in polymer processing equipment selected from a roll-type mill, an extruder and a molding apparatus.

14. A hydrogen sorbent composition according to claim 12, characterized in that the fibrillatable first polymer is converted to fibrous form by processing in-situ.

15. A hydrogen sorbent composition according to claim 12, characterized in that the pore-former is water soluble.

16. A hydrogen sorbent composition according to claim 15, characterized in that the pore-former is leachable in an ultrasonic water bath.

17. A hydrogen sorbent composition comprising a hydridable material encradled throughout a fiber-containing polymeric material having interconnecting porosity therethrough, said composition being developed from a substantially dry mixture of compatible and non-reactive components consisting essentially of:
(A) a particulate hydridable material, a fibrillatable organic polymer, and a major amount of removable pore-former, or
(B) a particulate hydridable material, a fibrillatable organic first polymer, a support-contributing second polymer and a major amount of removable pore-former;

said pore-former being an organic polymer having a molecular weight of about 100,000 to 1,000,000 and being present in the mixture of component in the amount of about 70% to about 80% by volume, and said porosity of the composition being developed in the mixture of components on removal of the pore-former after fibrillation of the fibrillatable polymer, whereby accessibility to the hydridable material in the composition is maximized.

18. A hydrogen sorbent composition according to claim 17, wherein the mixture of components is a non-aqueous system, thereby permitting the use of a water soluble component as the removable pore-former during processing.

19. A hydrogen sorbent composition according to claim 17, wherein the fibrillatable polymer comprises polytetrofluoroethylene.

* * * * *